Jan. 12, 1971  R. W. CASHMAN  3,554,565

CHUCK CONSTRUCTION

Filed Feb. 9, 1968  2 Sheets-Sheet 1

INVENTOR
ROBERT W. CASHMAN
BY
Learman & McCulloch
ATTORNEYS

Jan. 12, 1971   R. W. CASHMAN   3,554,565
CHUCK CONSTRUCTION
Filed Feb. 9, 1968
2 Sheets-Sheet 2
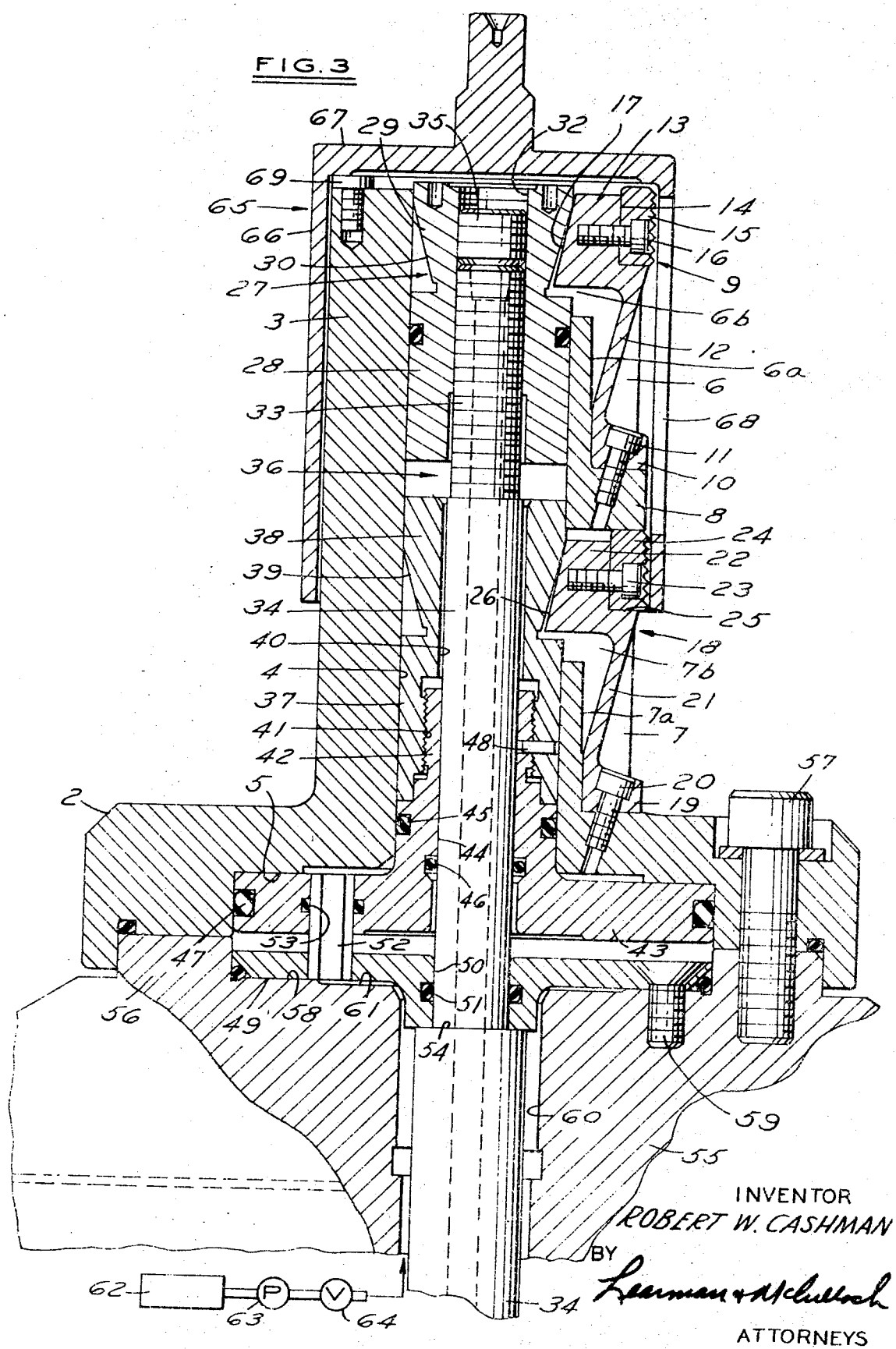
INVENTOR
ROBERT W. CASHMAN
BY
Leaman & McCulloch
ATTORNEYS

3,554,565
CHUCK CONSTRUCTION
Robert W. Cashman, Saginaw, Mich., assignor to Saginaw Machine and Tool Company, Saginaw, Mich., a corporation of Michigan
Filed Feb. 9, 1968, Ser. No. 704,280
Int. Cl. B23b *31/40, 31/30*
U.S. Cl. 279—4                                   11 Claims

ABSTRACT OF THE DISCLOSURE

A chuck construction having a rotatable head on which is mounted a plurality of sets of axially spaced, radially expansible and contractile jaws and axially reciprocable, cam operating means for effecting radial movement of each set of jaws independently of one another.

---

The invention disclosed herein relates to a chuck construction of the kind adapted to clamp a workpiece on a rotatable spindle of a boring, turning, milling, grinding or other machine. More particularly, the invention relates to a chuck having a plurality of sets of clamping jaws and in which the sets of jaws may be adjusted independently of one another so as to effect optimum clamping of a workpiece.

In the machining of certain kinds of workpieces considerable care must be taken in the chucking of the workpiece so as to avoid distorting the latter during machining operations. For example, a relatively long cylinder can be distorted quite easily in conventional chucks with the result that too much or too little metal may be removed in the machining operation. A cylinder which is closed at one end and open at the other is capable of withstanding greater chucking pressure adjacent its closed end than at its open end, particularly if the wall of the cylinder is relatively thin. To avoid distortion of the cylinder, therefore, it is desirable that less chucking pressure be applied at the open end of the cylinder than at its closed end. There are many other instances in which it is desirable to utilize differential chucking pressures at axially spaced zones of a workpiece.

An object of this invention is to provide a chuck which has a plurality of sets of individually operable chucking jaws and means for actuating each set of jaws independently of one another so as to apply differential chucking pressures to each set of jaws.

Another object of the invention is to provide chuck apparatus of the character described and in which the application of chucking pressures to a workpiece effects proper seating of the workpiece on the chuck.

A further object of the invention is to provide chuck apparatus having the foregoing characteristics and which is so constructed as to be self-releasing.

Other objects and advantages of the invention will be pointed out specifically or will become apparent from the following description when it is considered in conjunction with the appended claims and the accompanying drawings, in which:

FIG. 3 is an enlarged, fragmentary, vertical sectional view.

Figure 1:
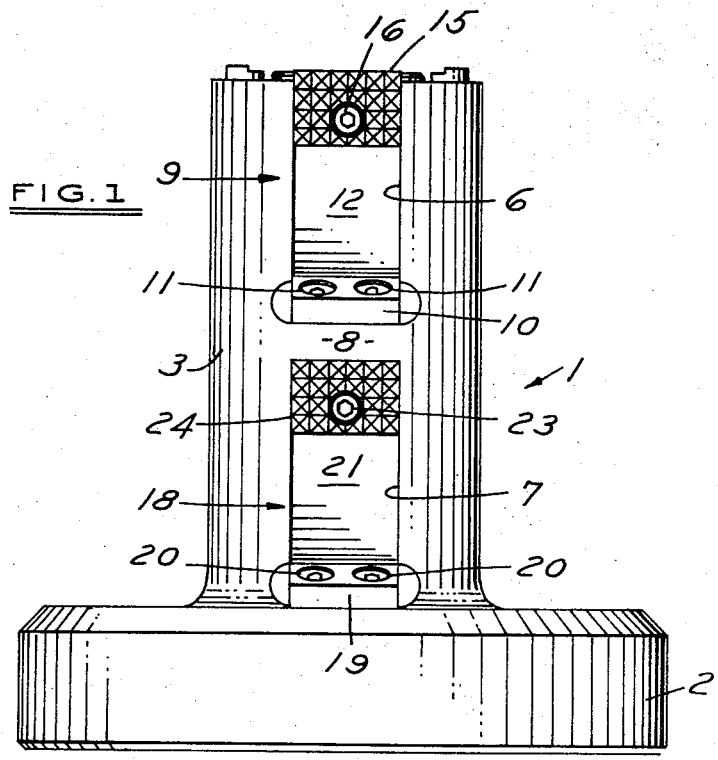
FIG. 1 is a side elevational view of a chuck constructed in accordance with the invention.

Apparatus constructed in accordance with the invention comprises a rotatable body 1 having an annular base 2 from one side of which extends an upstanding column 3 that is internally bored as at 4 (FIG. 3). At its lower end the bore 4 communicates with a counterbore 5 formed in the base 2. Adjacent its outer end, the column 3 is provided with a plurality, e.g. three, axially extending, circumferentially spaced grooves 6. Adjacent its inner end, the column is provided with a preferably corresponding number of axially extending, circumferentially spaced grooves 7, the grooves 6 and 7 of each group being separated axially by a rib 8 forming part of the column 3. For the greater part of its length, each groove 6 is not as deep as the thickness of the column wall 3, thereby providing a bottom 6a for each groove 6. Adjacent the outer end of the groove 6, however, the latter extends completely through the column wall so as to provide a slot 6b. Each groove 7 is similarly formed so as to provide a bottom 7a, and adjacent the upper end of each groove 7 the bottom 7a terminates so as to provide a slot 7b.

Accommodated in each groove 6 is a resilient jaw member 9 comprising a foot 10 that is secured to the rib 8 by bolts 11, a spring arm or leaf 12 extending upwardly and outwardly from the foot 10 and terminating in a head 13. The outer face of the head 13 preferably is recessed as at 14 to accommodate a pad 15 that is anchored to the head by means of a bolt 16. The inner surface of the head 13 is inclined to provide a sloping cam surface 17.

In each of the grooves 7 is a jaw member 18, each of which comprises a foot 19 fixed to the base 2 by bolts 20 and joined by means of a spring leaf arm 21 to a head 22 which occupies the slot 7b. Secured to each head 22 by means of a bolt 23 is a pad 24, the pad 24 being received in a recess 25 formed in the outer surface of the head. The inner surface of each head 22 is provided with an inclined cam surface 26.

Operating means 27 is provided for effecting radially inward and outward movements of the jaws 9 and comprises a sleeve 28 axially reciprocable within the bore 4 and terminating at its upper end in a frustoconical cam member 29 having an inclined, outer surface 30 which bears against the cam surfaces 17 of each of the jaw heads 13. The sleeve 28 and the cam 29 have a common threaded bore 32 in which is accommodated the correspondingly threaded end 33 of a drawbar 34 and a threaded locking member 35. Rotation of the drawbar 34 relative to the sleeve 28 effects axial adjustment of those members and the member 35 maintains the members 28 and 34 in axially adjusted positions.

Separate and independent fluid pressure operating means 36 for actuating the jaws 18 also is slidably accommodated in the bore 4 and comprises a sleeve member 37 terminating at its upper end in a generally frustoconical cam member 38 having an inclined outer surface 39 which bears against the cam surface 26 on each of the jaw heads 22. The sleeve 37 and the cam 38 have a common bore 40 of such size as freely to accommodate the drawbar 34, and adjacent the lower end of the sleeve 37 is an enlarged, threaded bore 41 in which is received the correspondingly threaded end 42 of a piston 43 which is accommodated in the counterbore 5 and which is provided with an axial bore 44 which slidably receives the drawbar 34. A seal 45 is interposed between the bore 4 and the piston 43, and a similar seal 46 is interposed between the piston and the drawbar 34. An additional seal 47 is seated between the piston 43 and the counterbore 5. A coupling pin 48 is accommodated in aligned openings formed in the sleeve 37 and the piston end 42 so as to couple those members to one another for conjoint movement and to restrain relative rotation therebetween.

The apparatus includes an annular plate base 49 having a centrally located opening 50 through which the drawbar 34 slideably extends, a seal 51 being interposed between the opening 50 and the drawbar. Fixed in the base plate 49 is a tubular conduit 52 which extends completely through the base plate 49 and through the piston 43. A seal 53 is interposed between the piston 43 and the conduit 52. The plate 49 is adapted to bear against a shoulder 54 formed on the drawbar 34, thereby limiting relative axial movement of the drawbar and the base plate 49.

Figure 2:
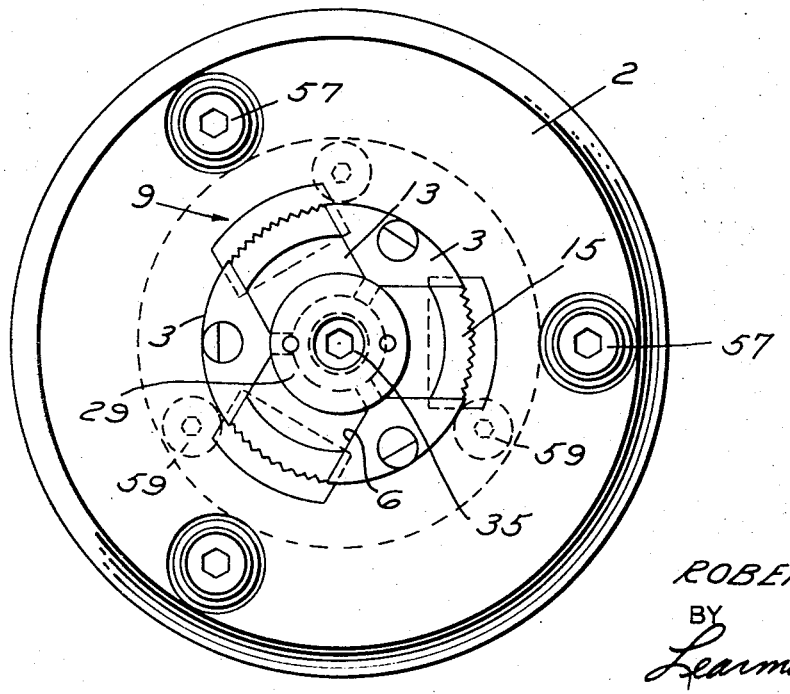
FIG. 2 is a top plan view.

The chuck is adapted to be secured to a motor driven, rotatable spindle 55 of conventional type and having an upstanding, annular flange 56 atop which the base 2 may be secured by a plurality of bolts, one of which is shown at 57 in FIG. 2. Within the flange 56 is a well 58 in which the base plate 49 is received, the latter being fixed to the spindle by suitable screws 59. The spindle 55 is provided with an axial bore 60 through which the drawbar 34 extends for connection at its lower end to a pneumatic or mechanical reciprocating device of any conventional construction. The bore 60 is substantially larger than the diameter of the drawbar 34 and terminates at its upper end in a fluid passage 61 which communicates with the tubular conduit 52. Hydraulic fluid from a reservoir 62 may be delivered by means of a reversible pump 63 to the bore 60, as indicated by the arrow in FIG. 3, and thence to the passage 61 and to the conduit 52 under the control of a valve 64.

A chuck constructed in accordance with the disclosed embodiment is especially adapted for use in chucking an elongated, cylindrical workpiece 65 having an annular side wall 66 and an end wall 67. As illustrated, the workpiece 65 is provided with a plurality of axially extending slots 68 between the opposite ends of its side wall.

When the chuck is in condition to receive or release a workpiece 65, the sets of jaw members 9 and 18 are in the radially retracted positions shown in FIG. 3. The workpiece 65 then may be slid onto or off the column 3. If desired, the upper end of the column 3 may be provided with a plurality of rests 69 to bear against the end wall of the workpiece.

When the workpiece has been mounted on the column 3, either one or both sets of jaws 9 and 18 may be expanded radially into clamping engagement with the workpiece. The jaws 9 may be expanded radially by downward movement of the drawbar 34 from the position shown in FIG. 3, whereupon the cam 29 bears against the heads 13 and moves the latter radially outwardly under uniform force. Such movement of the heads 13 is permitted by reason of the resilience of the arms 12. Inasmuch as the drawbar 34 is movable axially independently of the operating means 36, actuation of the operating means 27 will have no effect at all on the set of jaw members 18.

To expand the jaw members 18 into clamping engagement with the workpiece, hydraulic fluid under pressure is delivered to the tubular conduit 52 and introduced between the piston 43 and the counterbore 5 so as to exert a force on the piston causing the latter to be displaced downwardly from the position shown in FIG. 3. As the piston 43 moves downwardly, the cam 38 also will move downwardly causing radially outward displacment of the heads 22 into clamping engagement with the wall 66 of the workpiece. The force with which the jaws 18 engage the workpiece will depend upon the extent of displacement of the piston 43, and such force may be greater, less than, or the same as the force exerted on the workpiece by the jaw 9.

Whether or not both sets of jaws are expanded into clamping engagement with a workpiece is a matter for determination by the machine operator. Either set of jaws may be utilized to clamp the workpiece, or both sets of jaws may be so used, and the clamping force applied by the sets of jaws may be controlled by the operator.

Although clamping movement of the jaws 9 and 18 has been characterized as being radially outward in direction, the outward deflection of each spring arm results in its associated head moving along a path having radially outward and axially dowwnard components. Consequently, expansion of the jaws into clamping engagement with the workpiece will cause the latter to be drawn snugly against the rests 69 so as accurately and firmly to seat each workpiece on the chuck.

When the machine operation on one workpiece has been completed, hydraulic fluid may be permitted to return via the conduit 52 to the reservoir and the drawbar 34 may be moved upwardly so as to enable the spring leaves 12 and 21 to effect radial contraction of the jaws 9 and 18, respectively. The machined workpiece may then be removed from the chuck and another workpiece substituted in its place.

The disclosed embodiment is representative of a presently preferred form of the invention but is intended to be illustrative rather than definitive thereof. The invention is defined in the claims.

I claim:

1. A chuck construction comprising a body rotatable about an axis; a first set of jaws mounted on said body for movement radially thereof; a second set of jaws mounted on said body for movement radially thereof and spaced axially from said first set of jaws; first operating means comprising cam means carried by said body adjacent and in engagement with the jaws of said first set of jaws and operable to move the jaws of said first set of jaws radially to any selected one of a number of adjusted positions and to maintain the jaws of said first set of jaws in said selected position; means for reciprocating said first operating means axially of said body to effect movement of the jaws of said first set of jaws radially inwardly and outwardly of said axis of rotation; and second operating means operable to move the jaws of said second set of jaws radially of said body to any selected one of a number of adjusted positions and to maintain the jaws of said second set of jaws in said selected positions, said first and second operating means being operable independently of another and in any selected order of operation.

2. The construction set forth in claim 1 wherein said second operating means is reciprocable axially of said body.

3. The construction set forth in claim 2 wherein the jaws of each of said sets of jaws comprise a resilient arm having a head and wherein each of said operating means comprises a cam member in engagement with the heads of the associated jaws and operable to effect movement of the latter radially of said body in response to axial reciprocation of said cam member.

4. The construction set forth in claim 3 wherein movement of the heads includes a component axial of said axis.

5. The construction set forth in claim 1 wherein said first operating means includes pressure fluid means.

6. The construction set forth in claim 1 wherein said second operating means includes reciprocable drawbar means.

7. The construction set forth in claim 1 wherein one of said operating means comprises reciprocable fluid pressure means and the other of said operating means comprises reciprocable drawbar means.

8. The construction set forth in claim 1 wherein said second operating means comprises second cam means carried by said body adjacent and in engagement with the jaws of said second set of jaws, and means for reciprocating said second cam means axially of said body to effect movement of the jaws of said second set of jaws radially inwardly and outwardly of said axis of rotation.

9. The construction set forth in claim 8 wherein said second cam means is carried by a reciprocable piston member.

10. The construction set forth in claim 1 wherein each of said sets of jaws comprises a plurality of leaf spring members spaced circumferentially about the axis of said body.

11. A chuck construction comprising a body rotatable about an axis; a first set of jaws; first resilient means mounting said jaws on said body for movement radially thereof; a second set of jaws spaced axially from said first set of jaws; second resilient means mounting said second set of jaws on said body for movement radially thereof; first operating means operable to move the jaws of said first set of jaws radially to any selected one of a number of adjusted positions and to maintain the jaws of said first set of jaws in said selected position; and second operating means operable to move the jaws of said second set of jaws radially of said body to any selected one of a number of adjusted positions and to maintain the jaws of said second set of jaws in said selected position, said first and second operating means being operable independently of one another and in any selected order of operation.

References Cited

UNITED STATES PATENTS

| | | | |
|---|---|---|---|
| 1,900,934 | 3/1933 | Hudson. | |
| 3,216,733 | 11/1965 | Parker et al. | 279—2 |
| 3,434,709 | 3/1969 | Ramsay | 269—48.1 |
| 3,270,411 | 9/1966 | Thomas | 269—48.1X |

ROBERT C. RIORDON, Primary Examiner

DONALD D. EVENSON, Assistant Examiner

U.S. Cl. X.R.

279—2